United States Patent
Chen et al.

(10) Patent No.: US 9,439,068 B2
(45) Date of Patent: Sep. 6, 2016

(54) DYNAMIC CONFIGURATION FOR A WIRELESS PERIPHERAL DEVICE

(71) Applicants: Timothy Chen, Aurora, OH (US); Dustin Cairns, Deerfield, OH (US)

(72) Inventors: Timothy Chen, Aurora, OH (US); Dustin Cairns, Deerfield, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 14/561,598

(22) Filed: Dec. 5, 2014

(65) Prior Publication Data

US 2016/0165439 A1   Jun. 9, 2016

(51) Int. Cl.
| | |
|---|---|
| H04L 9/32 | (2006.01) |
| G06F 9/00 | (2006.01) |
| H04W 12/06 | (2009.01) |
| H04W 76/02 | (2009.01) |
| H04L 29/06 | (2006.01) |
| H04L 12/24 | (2006.01) |

(52) U.S. Cl.
CPC .......... *H04W 12/06* (2013.01); *H04L 41/0803* (2013.01); *H04L 63/0281* (2013.01); *H04W 76/02* (2013.01)

(58) Field of Classification Search
CPC ... H04L 63/08; H04L 63/04; H04L 63/1408; H04L 63/20; H04L 29/08144
USPC ........ 726/2, 11, 12, 3, 4; 713/168, 150, 153; 709/220–221, 224, 228
See application file for complete search history.

(56) References Cited

U.S. PATENT DOCUMENTS

| | | | | |
|---|---|---|---|---|
| 6,928,067 | B1 * | 8/2005 | Hameleers ............ | H04W 92/02 370/352 |
| 7,010,603 | B2 * | 3/2006 | Martin, Jr. .......... | H04L 12/5692 709/227 |
| 7,509,417 | B1 | 3/2009 | Kammer et al. | |
| 7,685,263 | B2 * | 3/2010 | Redjaian ................ | G06F 21/57 380/255 |
| 8,032,939 | B2 * | 10/2011 | Palnitkar ....................... | 705/400 |
| 8,898,761 | B2 * | 11/2014 | Barkie .................... | G06F 21/51 726/7 |
| 2013/0176956 | A1 | 7/2013 | Yamamoto | |

FOREIGN PATENT DOCUMENTS

WO    2012/041532 A1    4/2012

OTHER PUBLICATIONS

GB, Combined Search and Examination Report, Application No. GB1521422.4, dated Jun. 1, 2016.

* cited by examiner

*Primary Examiner* — Hosuk Song
(74) *Attorney, Agent, or Firm* — Thompson Hine LLP

(57) ABSTRACT

A peripheral device for establishing a network connection with a gateway is disclosed, and includes a request module and a configuration logic. The request module sends a request for identification and receives an authenticator responsive to sending the request for identification. The authenticator includes data indicative of predefined settings of the gateway. The configuration logic is in data communication with a plurality of configurations stored within a memory of the peripheral device. In response to receiving the predefined settings from the request module, the configuration logic selects a specific configuration from the plurality of configurations, where the specific configuration defines a set of attributes that correspond to the predefined settings of the gateway. The configuration logic also activates the specific configuration once the specific configuration has been selected. The configuration logic also establishes a network connection with the gateway based on a wireless communication protocol.

27 Claims, 6 Drawing Sheets

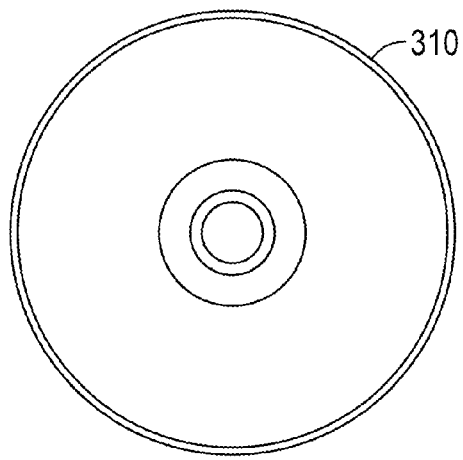
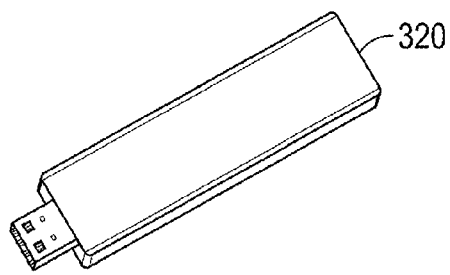
FIG. 5A                FIG. 5B
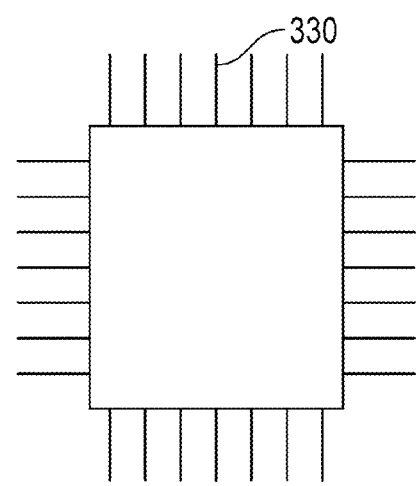
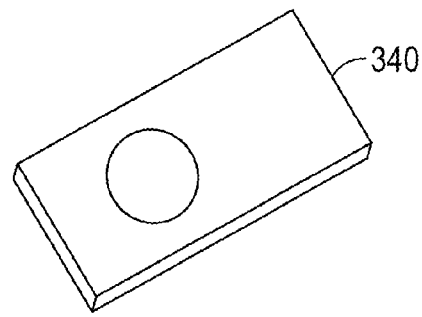
FIG. 5C                FIG. 5D

DYNAMIC CONFIGURATION FOR A WIRELESS PERIPHERAL DEVICE

TECHNICAL FIELD

The present disclosure relates generally to a dynamic configuration for a peripheral device, and more particularly to dynamically configuring a peripheral device based on predefined settings of a gateway.

BACKGROUND

Wireless lighting control systems may utilize radio frequency (RF) communication to communicate control signals to an antenna element mounted in a lighting fixture. For example, a user may turn on, turn off, or dim a light using wireless control. Specifically, a user may use a portable electronic device such as, for example, a smartphone or tablet computer that includes wireless control capabilities in order to communicate with the antenna element located within the lighting fixture.

A home, office, or other building typically includes numerous lighting fixtures for illumination. The lighting fixtures may be connected to a gateway that enables wireless communication between a user's portable electronic device and the lighting fixtures. The gateway is an electronic device used to wirelessly connect the portable electronic device to the lighting fixtures. In particular, the gateway may be wirelessly connected to the lighting fixtures using any number of low-power wireless communication protocols such as, for example, Bluetooth® low energy (BLE) or ZigBee®.

Lighting manufacturers currently produce lighting fixtures compatible with only a single wireless protocol as well as a single type of gateway device made by a specific manufacturer. In other words, lighting fixtures currently available typically only have the capability to be wirelessly connected using a specific wireless protocol (i.e., ZigBee®) as well as with a specific model number of a gateway device produced by a single manufacturer. As a result, end users always have to purchase specialized bulbs that are compatible with only one specific wireless protocol and gateway device.

SUMMARY

In one embodiment, a peripheral device is disclosed, and includes a request module and a configuration logic. The request module sends a request for identification and receives an authenticator responsive to sending the request for identification. The authenticator includes data indicative of predefined settings of the gateway. The configuration logic is in data communication with a plurality of configurations stored within a memory of the peripheral device. In response to receiving the predefined settings from the request module, the configuration logic selects a specific configuration from the plurality of configurations, where the specific configuration defines a set of attributes that correspond to the predefined settings of the gateway. The configuration logic also activates the specific configuration once the specific configuration has been selected. The configuration logic also establishes a network connection with the gateway based on a wireless communication protocol. Communication with the gateway follows the set of attributes defined by the specific configuration.

In another embodiment, a non-volatile computer readable medium including computer-interpretable instructions encoded to instruct a control module to perform a method is disclosed. The method includes sending a request for identification inquiring for data indicative of predefined settings of a gateway. The method also includes receiving an authorization signal responsive to sending the request for identification. The authorization signal includes the data indicative of the predefined settings of the gateway. The method further includes selecting a specific configuration in response to receiving the authorization signal. The specific configuration is stored within memory of the control module and defines a set of attributes specific to the predefined settings of the gateway. The method also includes activating the specific configuration within the control module in response to the specific configuration being selected. Finally, the method includes establishing a network connection with the gateway based on a wireless communication protocol. Communication with the gateway follows the set of attributes defined by the specific configuration.

In yet another embodiment, a method is disclosed. The method includes sending a request for identification inquiring for data indicative of predefined settings of a gateway by a control module of a peripheral device. The method also includes receiving an authorization signal by the control module responsive to sending the request for identification. The authorization signal includes the data indicative of the predefined settings of a gateway. The method further includes selecting a specific configuration by the control module in response to receiving the authorization signal. The specific configuration is stored within a memory of the control module and defines a set of attributes specific to the predefined settings of the gateway. The method also includes activating the specific configuration within the control module in response to the specific configuration being selected. Finally, the method includes establishing a network connection with the gateway based on a wireless communication protocol. Communication with the gateway follows the set of attributes defined by the specific configuration.

BRIEF DESCRIPTION OF THE DRAWINGS

FIG. 5A is a plan view of an optical storage device;

FIG. 5B is a plan view of a non-volatile memory chip;

FIG. 5C is a plan view of a non-volatile storage device; and

FIG. 5D is a perspective view of a hard disk drive.

DETAILED DESCRIPTION

Figure 1:
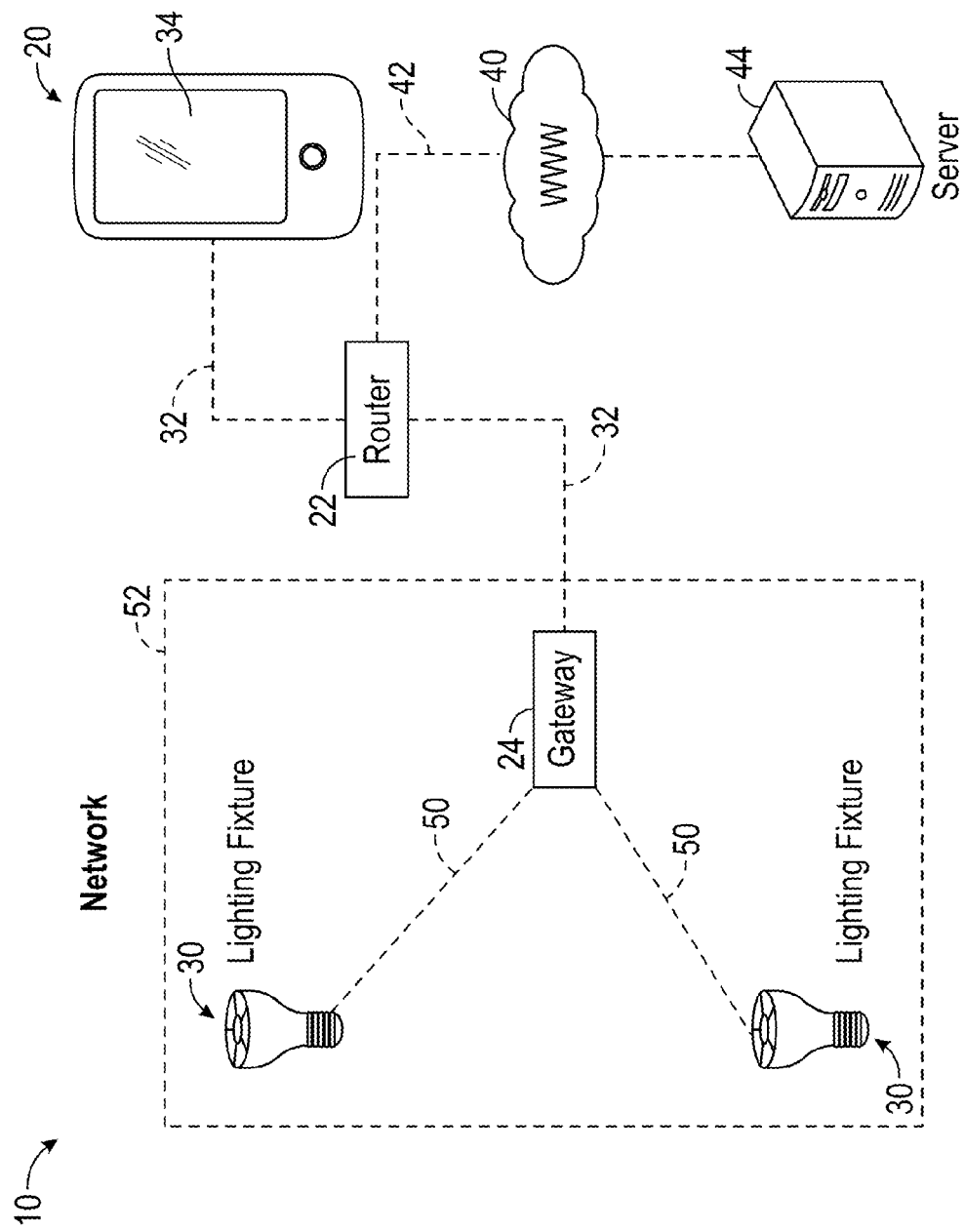
FIG. 1 is an illustration of an exemplary control system including a plurality of peripheral devices that are connected to a gateway through a wireless network.

The following detailed description will illustrate the general principles of the invention, examples of which are additionally illustrated in the accompanying drawings. In the drawings, like reference numbers indicate identical or functionally similar elements.

FIG. 1 is an exemplary block diagram of an exemplary control system 10. The control system 10 may include a portable electronic device 20, a router 20, a gateway 24, and one or more peripheral devices 30. As explained in greater detail below, the peripheral devices 30 may be controlled remotely by the portable electronic device 20. For example, in the embodiment as shown in FIG. 1, the peripheral devices 30 are lighting fixtures. The portable electronic device 20 may be manipulated by a user to control the color (e.g., red, blue, or green lighting), dimming, or power to the lighting fixtures. However, as explained in greater detail below, it is to be understood that FIG. 1 is merely exemplary in nature and the peripheral devices 30 are not limited to lighting fixtures.

The portable electronic device 20 may be any type of electronic device capable of sending and receiving radio frequency (RF) signals. In particular, in one non-limiting embodiment the portable electronic device 20 may be in communication with the router 22 by a short-range RF signal 32. For example, the RF signal 32 may be a Wi-Fi signal based on the Institute of Electrical and Electronics Engineers (IEEE) 802.11 standards. The portable electronic device 20 may be, for example, a handheld electronic device such as a smartphone, or a tablet computer. In another embodiment, the portable electronic device 20 may be a laptop computer, a personal computer or a vehicle such as an automobile.

The portable electronic device 20 may include a user interface that allows a user to enter input. The portable electronic device 20 may also include a display that generates an image visible to the user. In the non-limiting embodiment as shown, the user interface and display are combined with one another as a touchscreen 34. However, it is to be understood that the embodiment as illustrated in the figures is merely exemplary in nature, and that a separate user interface and display may be used as well.

The router 22 may wirelessly connect the portable electronic device 20 with the gateway 24. Specifically, the router 22 may be in wireless communication with both the portable electronic device 22 and the gateway 24 through the RF signal 32. The router 22 may also be in communication with a world-wide network of computers 40, also referred to as the world-wide web (WWW) through a network connection 42. The network connection 42 may be either a wired connection (e.g., an Ethernet connection) or wireless connection. The network of computers 40 may include a server 44. The router 22 connects the control system 10 with the network of computers 40 and the server 44.

The gateway 24 may be any type of device for wirelessly connecting with the router 22 through the RF signal 32 as well with as each of the peripheral devices 30 through a second RF signal 50. In one embodiment, the second RF signal 50 follow a low-power wireless communication protocol such as, but not limited to, Bluetooth® low energy (BLE), ZigBee®, WirelessHART®, or 6LoWPAN. The gateway 24 and the peripheral devices 30 comprise a wireless network 52. For example, the wireless network 52 may be a personal area network (PAN) if the BLE protocol is used. Alternatively, in another embodiment, the wireless network 52 may be a mesh network if the ZigBee® protocol is used. The gateway 24 acts as a parent node within the wireless network 52 and is used to verify formation of the wireless network 52 with the peripheral devices 30, which is described in greater detail below.

In the exemplary embodiment as shown in FIG. 1, the peripheral devices 30 are lighting fixtures for emitting visible light. Specifically, the lighting fixtures may be any type of illumination device for emitting visible light such as, but not limited to, an LED lamp, an incandescent lamp, a compact fluorescent lamp (CFL), or a gas-discharge lamp. The peripheral devices 30 may each include a corresponding antenna element 102 (shown in FIG. 2) for sending and receiving RF signals. In particular, the antenna elements 102 may be used to connect the corresponding peripheral device 30 with the gateway 24 though the wireless network 52. Although lighting fixtures are illustrated in FIG. 1, it is to be understood that this illustration merely exemplary in nature, and the peripheral devices 30 may be any type of device including an antenna element for communication with the wireless network 52. For example, in an alternative embodiment the peripheral devices 30 may be occupancy sensors or wireless power plugs.

Figure 2:
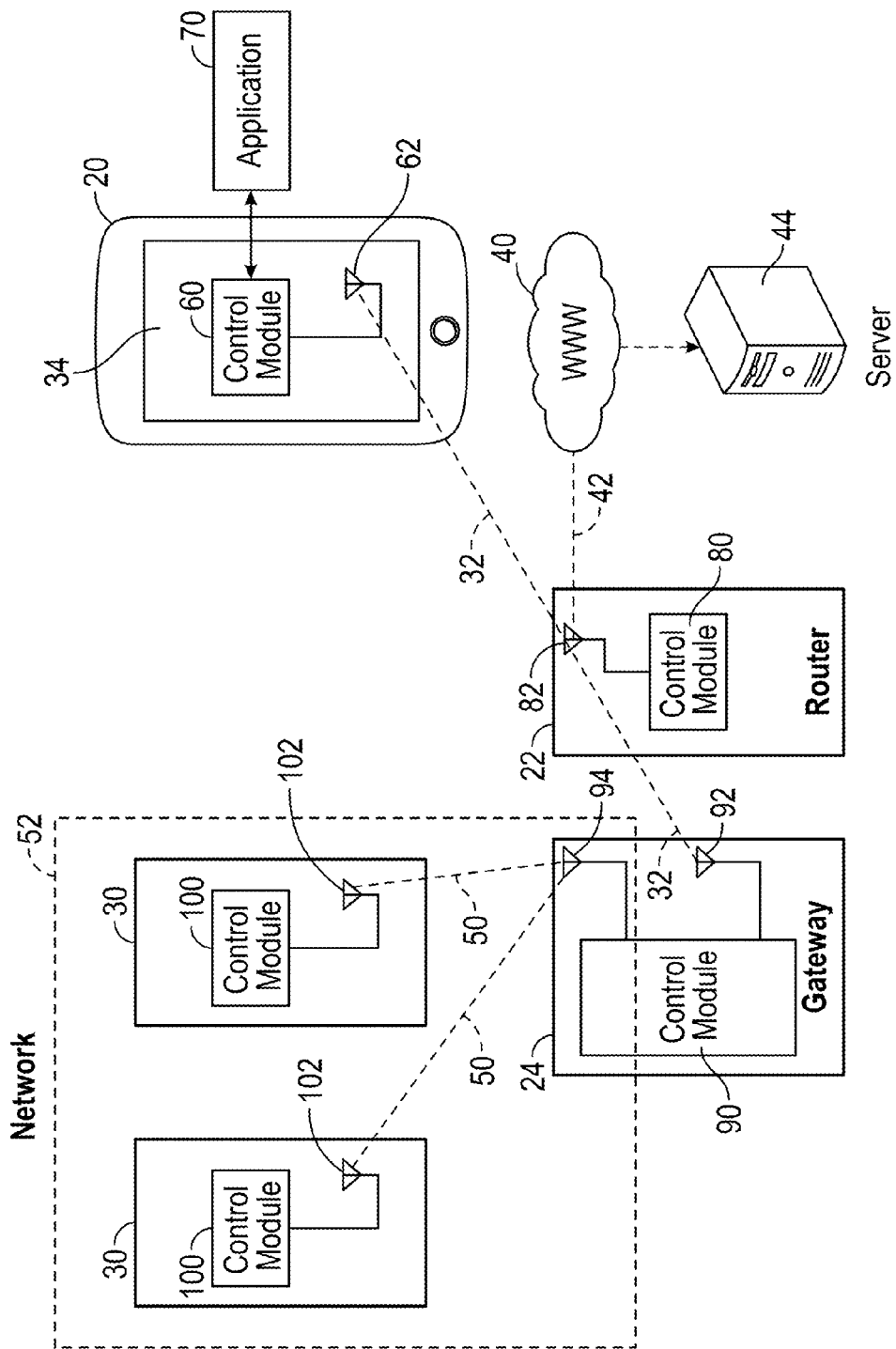
FIG. 2 is a block diagram of the control system shown in FIG. 1.

The portable electronic device 20 may be used to receive input from a user. The input received from the user is ultimately used to control the peripheral devices 30. Turning now to FIG. 2, the portable electronic device 20 includes a control module 60 and an antenna 62. As used herein, the term module may refer to, be part of, or include an application specific integrated circuit (ASIC), an electronic circuit, a combinational logic circuit, a field programmable gate array (FPGA), a processor (shared, dedicated, or group) having hardware or software that executes code, other suitable components that provide the described functionality, or a combination of some or all of the above, such as in a system-on-chip. The term module may include memory (shared, dedicated, or group) that stores code executed by the processor.

The antenna element 62 of the portable electronic device 20 may be in communication with the control module 60. The antenna element 64 of the portable electronic device 20 is capable of sending and receiving the RF signal 32 to and from the router 22. In one embodiment, an application 70 may be downloaded into memory of the portable electronic device 20. The application 70 may be used to enable wireless control of the peripheral devices 30 within the wireless network 52 by the portable electronic device 20. Specifically, the application 70 stored in memory of the portable electronic device 20 may include a one or more instructions stored therein that are executable by the control module 60 of the portable electronic device 20 and allow for the portable electronic device 20 to control the peripheral devices 30 within the wireless network 52. For example, if the peripheral devices 30 are lighting fixtures, then the application 70 stored in memory of the portable electronic device 20 may control of the color, dimming, or power of the lighting fixtures.

The router 22 also includes a control module 80 and an antenna element 82. The antenna element 82 of the router 22 is capable of sending and receiving the RF signal 32 to and from both the portable electronic device 20 and the gateway 24. Continuing to refer to FIG. 2, the gateway 24 includes one or more control modules 90, a first antenna element 92, and a second antenna element 94. For ease and simplicity of description, the gateway 24 is illustrated as having a single control module 90, however those of ordinary skill in the art will readily appreciate that multiple control modules may be used as well. The first antenna element 92 of the gateway 24 is capable of sending and receiving the RF signal 32 to and from the antenna element 84 of the router 22. The second antenna element 94 is capable of sending and receiving one or more RF signals 50 to and from each of the peripheral devices 30.

The control module 90 includes control logic for sending a network signal to one or more peripheral devices 30 attempting to join the wireless network 52. Specifically, the network signal includes a network identifier. The network identifier indicates the wireless network 52. For example, in one embodiment, the network identifier may be a PAN identifier (PAN ID). The control module 90 also includes control logic for authenticating one or more peripheral devices 30 attempting to join the wireless network 52. Specifically, the control module 90 includes control logic to generate an authenticator sent over the RF signal 50 and to one or more peripheral devices 30 attempting to join the wireless network 52. The authenticator includes information that facilitates a secure connection between the peripheral device 30 attempting to join the wireless network 52 and the gateway 24. For example, the authenticator may include a security identification number, which is also referred to as a passkey. In one embodiment, the passkey may be a four-digit number.

The control module 90 of the gateway 24 may also include control logic for generating an identifier sent over the RF signal 50 and to one or more peripheral devices 30. The identifier includes data or information indicative of predefined settings of the gateway 24. The predefined settings are stored within memory of the control module 90 of the gateway 24. Those of ordinary skill in the art will readily appreciate that gateways may include predefined settings such as, for example, the wireless communication protocol used to connect to the wireless network 52, the types of peripheral devices allowed to connect to the wireless network 52, or the operating system type (i.e., Linux). Specifically, in one embodiment the predefined settings are specific to a manufacturer and a model number of the gateway 24. As explained in greater detail below, a peripheral device 30 attempting to join the wireless network 52 may send a request for identification to the gateway 24, or to another peripheral device 30 in the wireless network 52. The control module 90 of the gateway 90 may generate the identifier in response to receiving the request for identification from the peripheral device 30.

It is to be understood that the manufacturer of the gateway 24 may be an entity that produces at least a portion of the gateway 24, and then supplies either a portion or the assembly to another entity. The other entity may be a distributor responsible for supplying the gateway 24 to end users. Alternatively, in another embodiment, the manufacturer of the gateway 24 may be the distributer that supplies the gateway 24 to end users.

Each of the peripheral devices 30 include a control module 100 and an antenna element 102. The antenna element 102 is capable of sending and receiving RF signals 50 to and from the gateway 24. The antenna element 102 is also capable of sending and receiving RF signals 50 from other peripheral devices 30 within the wireless network 52 (i.e., from another lighting fixture or occupancy sensor located within the wireless network 52).

Figure 3:
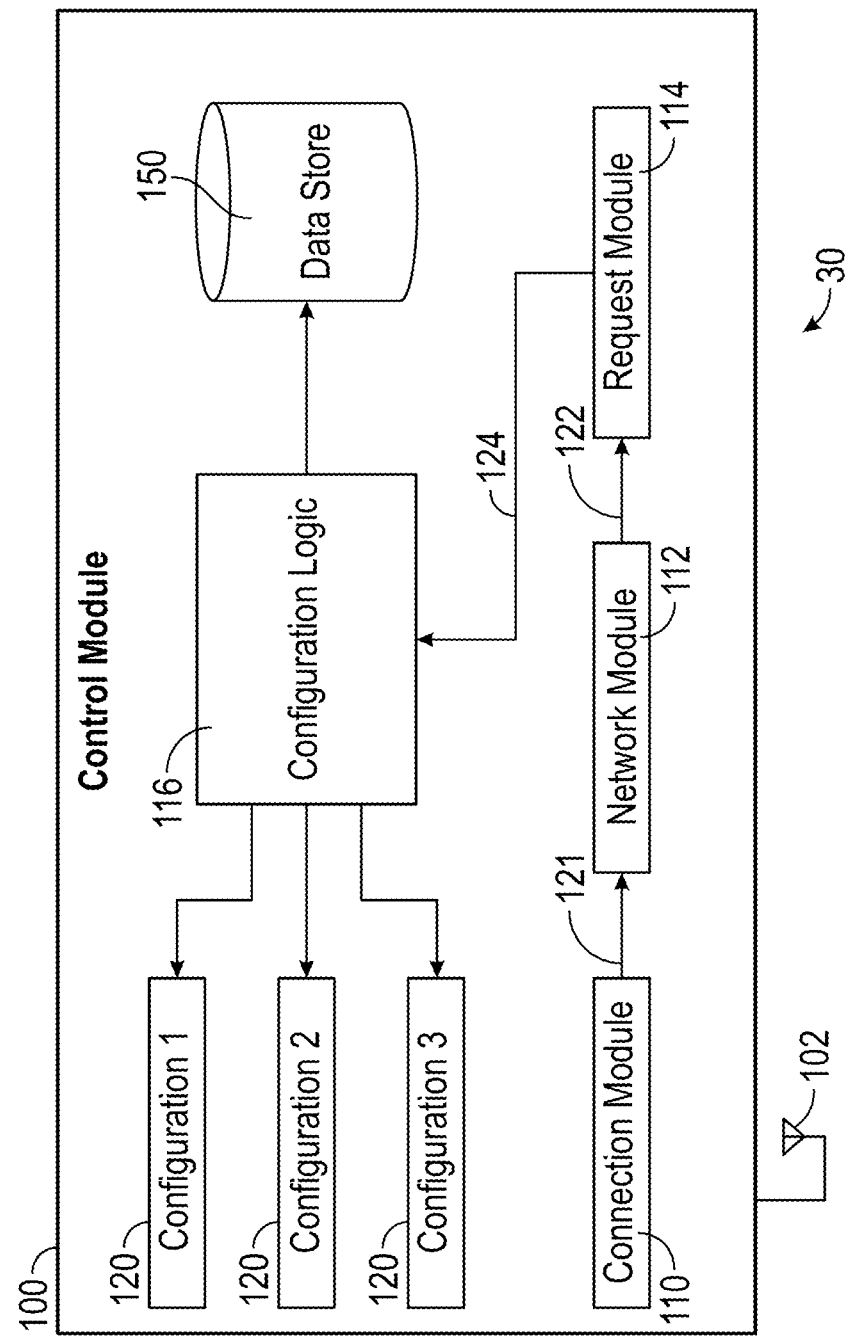
FIG. 3 is a block diagram of a selected one of the peripheral devices shown in FIG. 1.

FIG. 3 is a system block diagram of one of the peripheral devices 30. The control module 100 of the peripheral device 30 may include a plurality of modules that allow for the peripheral device 30 to establish a secure network connection with the gateway 24. Specifically, the control module 100 may include one or more non-volatile memory units for storing an operating system and software or firmware for storing a connection module 110, a network module 112, a request module 114, and a configuration logic 116. As explained in greater detail below, the configuration logic 116 of the control module 100 allows for the peripheral device 30 to select a configuration 120 based on the specific manufacturer and model number of the gateway device 24.

As seen in FIG. 3, the control module 100 of the peripheral device 30 includes a plurality of configurations 120 stored in memory of the control module 100. For example, embodiment as shown in FIG. 3, the control module 100 stores configuration 1, configuration 2, and configuration 3 within the data store 150. However, it is to be understood that FIG. 3 is merely exemplary in nature and any number of configurations may be included as well. The configuration logic 116 is in data communication with each of the configurations 120.

Each configuration 120 stored within memory of the control module 100 defines a set of attributes or rules unique to a specific manufacturer and model number of the gateway device 24. In other words, the control module 100 of the peripheral device 30 may store any number of configurations that match up or are compatible with a number of different gateway devices commercially available. Thus, the peripheral device 30 may be able to establish communication and connect with any number of gateways currently available. As explained in greater detail below, the configuration logic 116 of the control module 100 of the gateway 24 selects and activates one of the configurations 120 based on the specific manufacturer and model number of the gateway device 24 within the wireless network 52.

Referring to both FIGS. 2-3, once a specific peripheral device 30 is powered on for the first time, or after a factory reset of the peripheral device 30, the connection module 110 of the peripheral device 30 generates a connection signal to connect the antenna element 102 with a wireless signal. Specifically, the connection signal is used to connect the antenna element 102 of the peripheral device 30 with the RF signal 50. Once the antenna element 102 is in communication with the RF signal 50, the connection module 110 sends a search signal across the wireless network 52 to locate the parent node (i.e., the gateway 24) of the wireless network 52.

Once the gateway 24 is located by the peripheral device 30, the connection module 110 sends a request to the gateway 24 for the network identifier. As discussed above, the control module 90 of the gateway 24 may generate the network signal in response to receiving the request for the network identifier from the peripheral device 30. The network signal includes the network identifier. Once the connection module 110 of the peripheral device 30 receives the network identifier, connection module 110 may send a signal 121 to the network module 112. The signal 121 includes the network identifier received from the gateway 24.

The network module 112 may send a request for authentication to the antenna 94 of the gateway 24 in response to receiving the signal 121 from the connection module 110. Once the control module 90 of the gateway 24 receives the request for authentication from the network module 112 of the peripheral device 30, the control module 90 of the gateway 24 includes control logic for generating the authenticator that is sent through the RF signal 50 and to the antenna 102 of the peripheral device 30. As explained above, the authenticator includes information such as, for example, the passkey for the wireless network 52.

Once the network module 112 of the peripheral device 30 receives the authenticator from the gateway 24, then the network module 112 of the peripheral device 30 may send a signal 122 to the request module 114. The signal 122 includes information from the authenticator such as, for example, the passkey of the wireless network 52. The request module 114 may send a request for identification to the gateway 24 in response to receiving the signal 122 from the network module 112. The request for identification may ask for the predefined settings (i.e., the specific manufacturer and model number) of the gateway 24.

It is to be understood that there are a variety of different approaches that may be used to obtain the manufacturer and model number of the gateway 24. For example, in one embodiment the request for identification may query the control module 90 of the gateway 24 for the specific manufacturer and model number of the gateway device 24. Upon receipt of the request for identification, the processor 90 of the gateway device 24 may generate the identifier. The identifier includes the manufacturer as well as the model number of the gateway 24. The identifier generated by the control module 90 of the gateway 24 is sent to the control module 100 of the peripheral device 30.

In another embodiment, the request for identification may include a request for attributes associated with a publically available or standard available cluster of the gateway 24. For example, different attributes and commands associated with the gateway 24 may be stored within memory of the control module 90 of the gateway 24 in the standard available cluster. In one embodiment, the standard available cluster may be the Basic Cluster including a Manufacturer Name attribute as well as a Model Number attribute. Those of ordinary skill in the art will readily appreciate that the Basic Cluster includes a cluster ID equal to 0x0000 as specified in the Zigbee® Cluster Library Specification, Zigbee® Standards Organization, May 2012. Moreover, the Basic Cluster is present in any device that supports the Zigbee® wireless communication protocol.

Upon receipt of the request for identification from the peripheral device 30, the processor 90 of the gateway device 24 may generate the identifier. The identifier generated by the control module 90 of the gateway 24 includes the Manufacturer Name attribute as well as a Model Number attribute of the Basic Cluster. The identifier generated by the control module 90 of the gateway 24 is sent to the control module 100 of the peripheral device 30. Upon receipt of the identifier from the gateway 24, the request module 114 of the control module 100 of the peripheral device 30 includes control logic for decoding the Basic Cluster to obtain the manufacturer as well as the model number of the gateway 24.

In another embodiment, the request for identification may include a request for node descriptors of the gateway 24. Specifically, the memory of the control module 90 of the gateway 24 may contain multiple node descriptors (i.e., the node descriptor, the node power descriptor, the simple descriptor, the complex descriptor, and the user descriptor). Upon receipt of the request for identification, the processor 90 of the gateway device 24 may generate the identifier, which includes the node descriptors. The identifier generated by the control module 90 of the gateway 24 is sent to the control module 100 of the peripheral device 30. Upon receipt of the identifier from the gateway 24, the request module 114 of the control module 100 of the peripheral device 30 includes control logic for decoding the node descriptors to obtain the manufacturer as well as the model number of the gateway 24.

In yet another embodiment, the request for identification includes a request for an application or software ID of the gateway. Specifically, the memory of the control module 90 of the gateway 24 may contain the a application or software ID. The software ID is specific to the gateway 24. In particular, the software ID is specific to the manufacturer and model number of the gateway device 24. Upon receipt of the request for identification, the processor 90 of the gateway device 24 may generate the identifier, which includes the software ID. The identifier generated by the control module 90 of the gateway 24 is sent to the control module 100 of the peripheral device 30. Upon receipt of the identifier from the gateway 24, the request module 114 of the control module 100 of the peripheral device 30 then decodes the software ID to obtain the manufacturer as well as the model number of the gateway 24.

Alternatively, in another embodiment, the software ID may be stored within memory of the control module 80 of the router 22. Upon receipt of the request for identification from the peripheral device 30, the processor 90 of the gateway 24 may query the control module 80 of the router 22 for the software ID. The control module 80 of the router 22 may send the software ID to the control module 100 of the gateway 24 through the RF signal 32. Once the control module 100 receives the software ID from the router 22, the control module 90 of the gateway 24 may then send the identifier to the control module 100 of the peripheral device 30. Upon receipt of the identifier from the gateway 24, the request module 114 of the control module 100 of the peripheral device 30 then decodes the software ID to obtain the manufacturer as well as the model number of the gateway 24.

In still another embodiment, the request for identification may query a device other than the gateway 24 within the wireless network 52 for the specific manufacturer and model number of the gateway device 24. For example, the request for identification may instruct the gateway 24 to send a query signal to another device connected to the wireless network 52 such as, for example, a wireless occupancy sensor (not shown in the figures), or another one of the peripheral devices 30. Upon receipt of the query signal, a control module of the device (not illustrated) may generate the identifier. The identifier includes the manufacturer as well as the model number of the gateway 24. The identifier may be sent to directly from the device to the peripheral device 30 requesting the manufacturer and the model number of the gateway 24, or alternatively the identifier may be sent back to the control module 90 of the gateway 24. The control module 90 of the gateway 24 may then send the identifier to the control module 100 of the peripheral device 30.

Continuing to refer to FIGS. 2 and 3, once the request module 114 of the peripheral device 30 receives the identifier indicating the manufacturer and model number of the gateway 24, then the request module 114 may send a signal 124 to the configuration logic 116. The signal 124 includes the manufacturer and model number of the gateway 24. The configuration logic 116 may select or determine a specific configuration 120 to be activated in response to receiving the signal 124 from the request module 114. The confirmation logic 116 selects the specific configuration 120 based on the specific manufacturer and model number of the gateway 24. For example, in one embodiment, the configuration logic 116 may search within a data store 150 within memory of the control module 100 of the peripheral device 30. The data store 150 indicates the manufacturer and model number that each configuration 120 is associated with. For example, in one embodiment the data store 150 may include a look-up table that stores the manufacturer as well as the model number of each configuration 120 stored within memory of the control module 100 of the peripheral device 30.

Once the configuration logic 116 of the control module 100 determines the specific configuration 120, then the configuration logic 116 may activate the specific configuration 120. Each of configuration 120 stored within memory of the control module 100 represents a group of attributes or rules that need to be followed for communication between the peripheral device 30 and the gateway 24. Some examples of the attributes that may be included in the configurations 120 include, but are not limited to, behavior as the device enters the wireless network 52, behavior when as the device leaves the network, and dimming transition speed (i.e., quick dimming, slow dimming, etc.). For example, if the peripheral device 30 is a lighting fixture, then the behavior as the lighting fixture enters the network may include a specific pattern of flashes (i.e., the lighting fixture blinks three times) to indicate a network connection is established. The behavior as the lighting fixture leaves the network may also include a specific pattern of flashes as well.

Once the specific configuration 120 is activated, the configuration logic 116 of the control module 100 may activate one or more blocks of firmware within memory of the control module 100 specific to the manufacturer and model number of the gateway 24. It is to be understood that other blocks of firmware stored within memory of the control module 100 of the peripheral device 30 that are not specific to the manufacturer and model number of the gateway 24 may remain deactivated. In other words, when a specific configuration 120 is activated, a particular logic path is taken, instead of multiple other optional paths. Once blocks of firmware specific to the manufacturer and model number of the gateway 24 are activated, then the control module 100 of the peripheral device 30 is in wireless communication with the gateway 24 through the wireless network 52. Accordingly, once communication is established between the peripheral device 30 and the gateway 24, the portable electronic device 20 may now communicate with the peripheral devices 30 included within the wireless network 52 based on the group of attributes defined by the specific configuration 120. For example, a user may manipulate the touchscreen 34 of the portable electronic device 20 to control the control the color, dimming, or power to the peripheral devices 30.

Figure 4A:
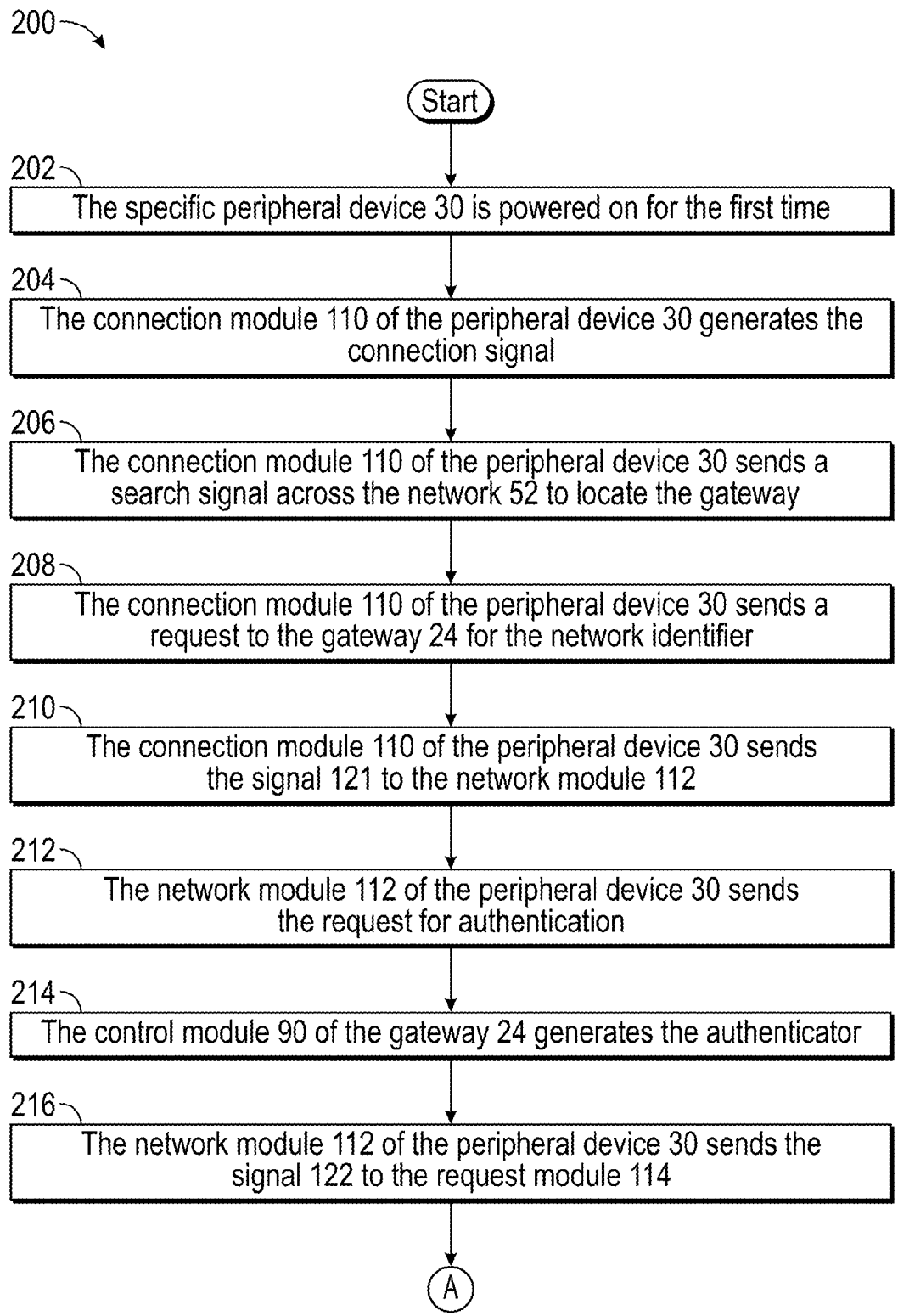
FIGS. 4A-4B are an exemplary process diagram illustrating a method of selecting a specific configuration for a peripheral device.
Figure 4B:
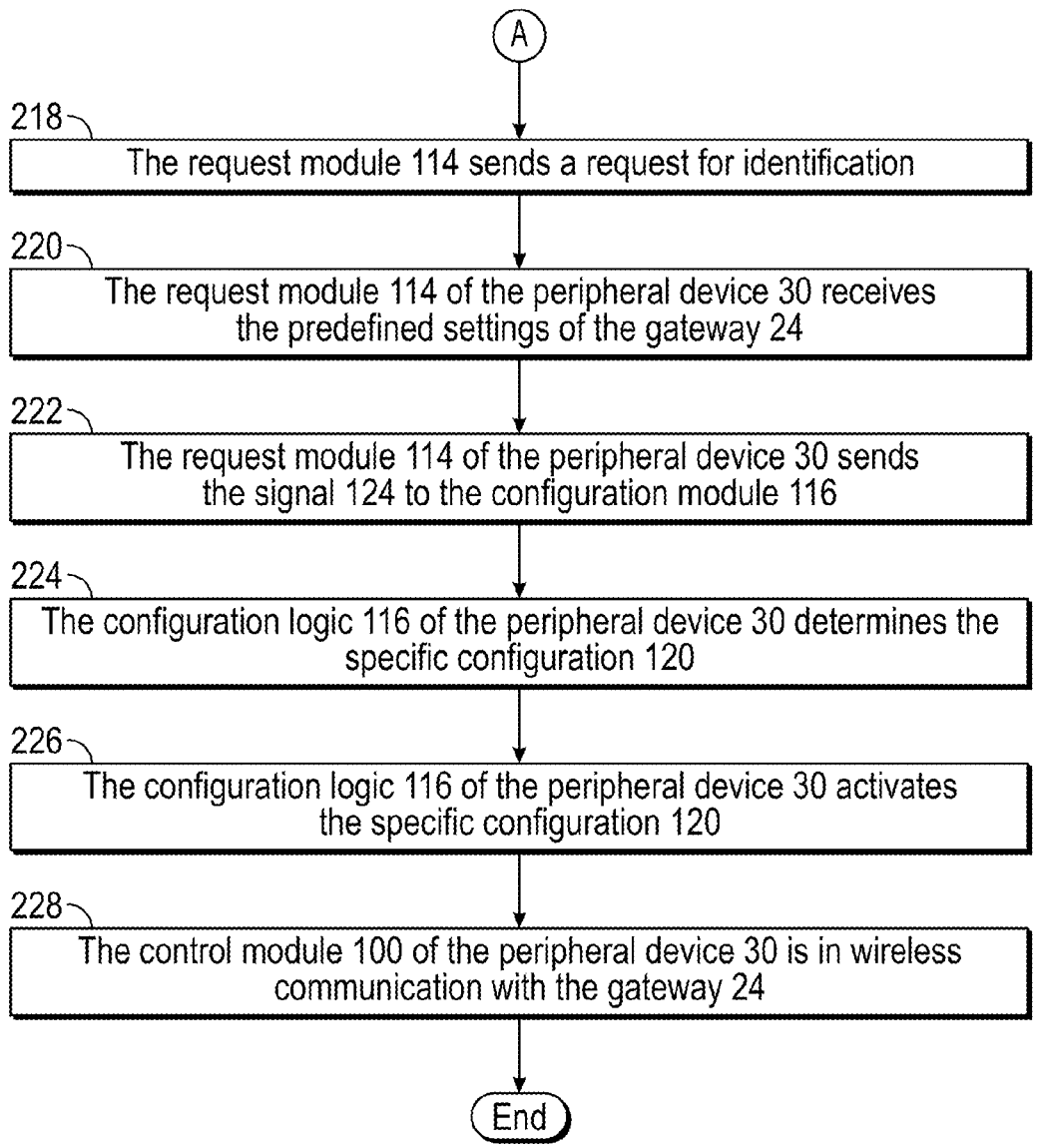

FIGS. 4A-4B illustrate an exemplary process flow diagram illustrating a method 200 for activating a specific configuration within a specific peripheral device 30. Referring generally to FIGS. 1-4B, method 200 may begin at block 202. In block 202, the specific peripheral device 30 is powered on for the first time, or a factory reset of the peripheral device 30 occurs. Method 200 may then proceed to block 204.

In block 204, the connection module 110 of the peripheral device 30 generates the connection signal to connect the antenna element 102 with the RF signal 50. Once the antenna element 104 is connected with the RF signal 50, method 200 may then proceed to block 206.

In block 206, the connection module 110 sends a search signal across the wireless network 52 to locate the parent node (i.e., the gateway 24) of the wireless network 52. Once the gateway 24 is located by the peripheral device 30, method 200 may then proceed to block 208.

In block 208, the connection module 110 sends a request to the gateway 24 for the network identifier. Once the connection module 110 of the peripheral device 30 receives the network identifier, method 200 may then proceed to block 210.

In block 210, the connection module 110 sends the signal 121 to the network module 112. The signal 121 includes the network identifier. Method 200 may then proceed to block 212.

In block 212, the network module 112 sends the request for authentication to the gateway 24. Once the gateway 24 receives the request for authentication from the network module 112 of the peripheral device 30, method 200 may then proceed to block 214.

In block 214, the control module 90 of the gateway 24 generates the authenticator that is sent over the RF signal 50 and to the antenna 102 of the peripheral device 30. Once the network module 112 of the peripheral device 30 receives the authenticator from the gateway 24, method 200 may proceed to block 216.

In block 216, the network module 112 of the peripheral device 30 sends the signal 122 to the request module 114. Once the request module 114 receives the signal 122, method 200 may then proceed to block 218.

In block 218, the request module 114 sends the request for identification to the gateway 24. Method 200 may then proceed to block 220.

In block 220, the request module 114 of the peripheral device 30 receives the predefined settings (i.e., the specific manufacturer and model number) of the gateway 24. It is to be understood that there are a variety of different approaches that may be used to obtain the manufacturer and model number of the gateway 24. Method 200 may then proceed to block 222.

In block 222, the request module 114 sends the signal 124 to the configuration logic 116. The signal 124 includes the manufacturer and model number of the gateway 24. Method 200 may then proceed to block 224.

In block 224, the configuration logic 116 100 determines the specific configuration 120 to be selected. For example, in one embodiment the configuration logic 116 performs a search within the data store 150 to determine the specific configuration. Once the specific configuration is determined, method 200 may then proceed to block 226.

In block 226, the configuration logic 116 may activate the specific configuration 120 stored within the memory of the control module 100 of the peripheral device 30. Method 200 may then proceed to block 228.

In block 228, the control module 100 of the peripheral device 30 is in wireless communication with the gateway 24 through the wireless network 52. Method 200 may then terminate.

Turning back to FIG. 2, in one embodiment the gateway 24 may send an interrogatory request over the wireless network 52 to the peripheral device 30 in response to establishing wireless communication between the peripheral device 30 and the gateway 24 through the wireless network 52. The interrogatory request queries the peripheral device 30 for its manufacturer and model number. The control module 100 of the peripheral device 30 may obtain its manufacturer and model number stored in memory and generates a response back to the gateway 24 in response to receipt of the interrogatory request from the gateway 24. The response sent to the gateway 24 through the network 52 includes the manufacturer and model number associated with the peripheral device 30.

The control module 90 of the gateway 24 may then store the manufacturer and model number of the peripheral device 30 within memory. It is to be understood that the gateway 24 may interrogate each peripheral device 30 connected to the network 52 once wireless communication is established. The control module 90 of the gateway 24 may store the manufacturer and model number of each peripheral device 30 connected to the wireless network 52 in memory. For example, in the embodiment as shown in FIG. 2, there are a total of two peripheral devices 30 connected to the wireless network 52. Accordingly, the manufacturer and model number of both the peripheral devices 30 are stored within memory of the control module 90 of the gateway 24.

Continuing to refer to FIG. 2, the server 44 located within the network of computers 40 may generate a request to the gateway 24 at a specified frequency for the manufacturer and model number of all peripheral devices 30 stored within memory of the control module 90. In an embodiment, the server 44 may be owned or controlled by the manufacturer of the gateway 24. The specified frequency may be, for example, every week, every two weeks, or every month. The control module 90 of the gateway 24 may search memory to determine the manufacturer and model number of each peripheral device 30 currently stored within memory in response to receiving the request from the server 44. The gateway 24 may then send a signal to the server 44 through the router 22 and the network of computers 40 indicating the total number of peripheral devices 30 within the wireless network 52. The server 44 may store the total number of peripheral devices 30 within the network 30 within memory.

Those of ordinary skill in the art will readily appreciate that the server 44 may be connected to a number of gateways located throughout a specific region. Accordingly, the server 44 may be able to determine to total number peripheral devices currently connected to gateways produced by a specific manufacturer within the specific region. For example, if the two peripheral devices 30 located within the wireless network 52 are produced by a specific manufacturer such as, for example, Technical Consumer Products Inc. (TCP), of Aurora, Ohio, then the server 44 stores this information within memory. The server 44 may also communicate with other gateways in a specific region to determine a total number of peripheral devices connected to gateways that are produced by TCP.

In one embodiment, the server 44 may also determine total royalty fees that are owed to the manufacturer of the gateway by a manufacturer of the peripheral devices 30 (i.e., TCP). The total royalty fees may be determined based on the total number of peripheral devices produced by TCP connected to gateways produced by the specific manufacturer within the specific region, as well as the individual royalty fee associated with each peripheral device.

FIG. 5A is a plan view of an optical storage device 310. The optical storage device 310 may be a compact disk (CD), a digital versatile disk (DVD), or a Blu-Ray disk. Specifically, the optical storage device 310 may be used to preserve computer readable and computer-executable instructions that may encode the software components and computer-implementable processes described above.

FIG. 5B is a plan view of a non-volatile memory chip 320. The non-volatile memory chip 320 may be a memory chip such as a flash memory chip or an electrically erasable programmable memory (EEPROM) chip. Specifically, the non-volatile memory chip 320 may be used in a computing device to preserve computer-readable and computer-executable instructions that may encode the software components and computer implementable processes described above.

FIG. 5C is a perspective view of a non-volatile storage device 330. The nonvolatile memory chip 330 may be a memory chip such as a flash memory chip or an EEPROM chip. Specifically, the nonvolatile memory chip 330 may be used with a computing device to preserve computer readable and computer-executable instructions that may encode the software components and computer-implementable processes described above during transport or transfer from one machine to another.

FIG. 5D is a perspective view of a hard disk drive 340. The hard disk drive 340 may include one or more magnetic platters or may be a solid-state hard drive. Specifically, the hard disk drive 340 may be used in a computing device to preserve computer-readable and computer-executable instructions that may encode the software components and computer-implementable processes described above.

Referring generally to the figures, the disclosed peripheral devices provide a relatively simple and cost-effective approach for wirelessly connecting to various types of gateways currently available. Those of ordinary skill in the art readily understand that lighting manufacturers typically produce lighting fixtures that are compatible with only a single wireless protocol as well as a single type of gateway device made by a specific manufacturer. In contrast, the disclosed peripheral devices may be dynamically configured based on the specific manufacturer and model number associated with a specific gateway within the wireless network. As a result, end users may no longer need to purchase specialized bulbs that are compatible with only a single gateway device.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A peripheral device for establishing a network connection with a gateway, comprising:
    a request module for sending a request for identification and receiving an authenticator responsive to sending the request for identification, wherein the authenticator includes data indicative of predefined settings of the gateway; and
    a configuration logic in data communication with a plurality of configurations stored within a memory of the peripheral device, wherein, in response to receiving the predefined settings from the request module the configuration logic:
        selects a specific configuration from the plurality of configurations, wherein the specific configuration defines a set of attributes that correspond to the predefined settings of the gateway;
        activates the specific configuration; and
        establishes the network connection with the gateway based on a wireless communication protocol, wherein communication with the gateway follows the set of attributes defined by the specific configuration.

2. The peripheral device of claim 1, wherein the predefined settings are specific to a manufacturer and a model number of the gateway.

3. The peripheral device of claim 2, wherein the peripheral device includes a data store within memory, and wherein the data store includes a look-up table including an associated manufacturer and an associated model number of each of the plurality of configurations.

4. The peripheral device of claim 1, wherein the peripheral device is a lighting fixture and the set of attributes that correspond to the predefined settings of the gateway include at least one of: behavior as the lighting fixture enters a network, behavior as the lighting fixture leaves the network, and dimming transition speed.

5. The peripheral device of claim 1, wherein the request for identification includes one of the following: a request for attributes associated with a standard available cluster of the gateway, a request for node descriptors of the gateway, and a request for a software ID of the gateway.

6. The peripheral device of claim 1, further comprising a connection module that generates a connection signal to connect the peripheral device with a wireless signal, wherein the wireless signal is based on the wireless communication protocol.

7. The peripheral device of claim 6, wherein the connection module generates a request to the gateway requesting a network identifier.

8. The peripheral device of claim 6, further comprising a network module that receives a signal including the network identifier from the connection module, and wherein the network module generates a request for authentication to the gateway.

9. A non-transitory computer readable medium including computer-interpretable instructions encoded to instruct a control module to perform a method, the method comprising:
   sending a request for identification inquiring for data indicative of predefined settings of a gateway;
   receiving an authorization signal responsive to sending the request for identification, wherein the authorization signal includes the data indicative of the predefined settings of the gateway;
   selecting a specific configuration in response to receiving the authorization signal, the specific configuration stored within memory of the control module and defines a set of attributes specific to the predefined settings of the gateway;
   activating the specific configuration within the control module in response to the specific configuration being selected; and
   establishing a network connection with the gateway based on a wireless communication protocol, wherein communication with the gateway follows the set of attributes defined by the specific configuration.

10. The non-transitory computer readable medium of claim 9, wherein the predefined settings are specific to a manufacturer and a model number of the gateway.

11. The non-transitory computer readable medium of claim 10, wherein a plurality of configurations are stored within the memory of the control module, and wherein each of the plurality of configurations define attributes unique to a specific manufacturer and a specific model number of the gateway device.

12. The non-transitory computer readable medium of claim 11, wherein selecting the specific configuration comprises performing a search within a data store located within the memory of the control module.

13. The non-transitory computer readable medium of claim 12, wherein the data store includes a look-up table including an associated manufacturer and an associated model number of each of the plurality of configurations.

14. The non-transitory computer readable medium of claim 9, wherein the control module is part of a lighting fixture and the set of attributes specific to the predefined settings of the gateway include at least one of: behavior as the lighting fixture enters a network, behavior as the lighting fixture leaves the network, and dimming transition speed.

15. The non-transitory computer readable medium of claim 9, wherein the request for identification includes one of the following: a request for attributes associated with a standard available cluster of the gateway, a request for node descriptors of the gateway, and a request for a software ID of the gateway.

16. A method, comprising:
   sending a request for identification inquiring for data indicative of predefined settings of a gateway by a control module of a peripheral device;
   receiving an authorization signal by the control module responsive to sending the request for identification, wherein the authorization signal includes the data indicative of the predefined settings of a gateway;
   selecting a specific configuration by the control module in response to receiving the authorization signal, the specific configuration stored within a memory of the control module and defines a set of attributes specific to the predefined settings of the gateway;
   activating the specific configuration within the control module in response to the specific configuration being selected; and
   establishing a network connection with the gateway based on a wireless communication protocol, wherein communication with the gateway follows the set of attributes defined by the specific configuration.

17. The method of claim 16, wherein the predefined settings are specific to a manufacturer and a model number of the gateway.

18. The method of claim 17, comprising storing a plurality of configurations within the memory of the control module, wherein each of the plurality of configurations defines attributes unique to a specific manufacturer and a specific model number of the gateway device.

19. The method of claim 16, wherein selecting the specific configuration comprises performing a search within a data store located within the memory of the control module.

20. The method of claim 19, wherein the data store includes a look-up table including an associated manufacturer and an associated model number of each of the plurality of configurations.

21. The method of claim 16, wherein the control module is part of a lighting fixture and the set of attributes that correspond to the predefined settings of the gateway include at least one of: behavior as the lighting fixture enters a network, behavior as the lighting fixture leaves the network, and dimming transition speed.

22. The method of claim 16, wherein the request for identification includes one of the following: a request for attributes associated with a standard available cluster of the gateway, a request for node descriptors of the gateway, and a request for a software ID of the gateway.

23. The method of claim 16, comprising sending an interrogatory request by the gateway in response to establishing the network connection between the peripheral device and the gateway, wherein the interrogatory request queries the control module for an associated manufacturer and an associated model number.

24. The method of claim 23, comprising obtaining the associated manufacturer and the associated model number of the control module, and generating a response back to the gateway indicating the associated manufacturer and the associated model number of the control module.

25. The method of claim 24, comprising storing the associated manufacturer and the associated model number of the control module within memory of the gateway.

26. The method of claim 25, wherein the gateway is in communication with a network of computers, and wherein the network of computers includes a server.

27. The method of claim 26, comprising generating a request by the server to the gateway at a specified frequency, wherein the request generated by the server asks for the associated manufacturer and the associated model number of the control module within memory of the gateway.

* * * * *